(12) United States Patent
Ramaswami et al.

(10) Patent No.: US 6,830,847 B2
(45) Date of Patent: Dec. 14, 2004

(54) ZINC/AIR CELL

(75) Inventors: Karthik Ramaswami, Sandy Hook, CT (US); Daniel Gibbons, Southbury, CT (US); Keith Buckle, Southbury, CT (US)

(73) Assignee: The Gillette Company, Boston, MA (US)

( * ) Notice: Subject to any disclaimer, the term of this patent is extended or adjusted under 35 U.S.C. 154(b) by 449 days.

(21) Appl. No.: 09/829,710

(22) Filed: Apr. 10, 2001

(65) Prior Publication Data

US 2002/0192545 A1 Dec. 19, 2002

(51) Int. Cl.[7] .......................... H01M 2/02; H01M 4/00; H01M 2/08
(52) U.S. Cl. .................. 429/171; 429/27; 429/174; 429/175
(58) Field of Search .................... 429/27, 175, 171, 429/174

(56) References Cited

U.S. PATENT DOCUMENTS

| | | | |
|---|---|---|---|
| 3,897,265 A | | 7/1975 | Jaggard |
| 4,041,211 A | * | 8/1977 | Wiacek ............... 429/36 |
| 4,364,800 A | | 12/1982 | Partridge |
| RE31,413 E | * | 10/1983 | Jaggard ............... 429/27 |
| 5,279,905 A | | 1/1994 | Mansfield |
| 5,306,580 A | | 4/1994 | Mansfield |
| 5,567,538 A | * | 10/1996 | Oltman et al. ............... 429/27 |
| 6,060,196 A | * | 5/2000 | Gordon et al. ............... 429/229 |

FOREIGN PATENT DOCUMENTS

| | | | |
|---|---|---|---|
| EP | 1028480 A2 | | 8/2000 |
| JP | 50-134137 | * | 10/1975 |
| JP | 53-084125 | * | 1/1978 |
| JP | 54-060424 | * | 5/1979 |

* cited by examiner

Primary Examiner—Patrick Ryan
Assistant Examiner—J. Mercado
(74) Attorney, Agent, or Firm—Barry D. Josephs; Paul I. Douglas; Thomas G. Krivulka

(57) ABSTRACT

A zinc/air button cell comprising a cathode casing and an anode casing wherein the anode casing is inserted into the cathode casing. The anode casing is formed of multiclad metal layers, for example nickel/stainless steel/copper. A protective metal is plated onto the exposed peripheral edge of the anode casing. The protective metal is desirably selected from copper, tin, indium, silver, brass, bronze or gold. The application of the protective metal covers the multiclad metals exposed along the peripheral edge surface. The protective metal is also desirably plated onto the portion of the outside surface of the anode casing abutting the insulating material placed between the anode and cathode casing. Application of the protective metal to the anode casing peripheral edge eliminates the potential gradients caused by exposure of the different metals comprising the multiclad material. This reduces the chance of electrolyte leakage which can be promoted by secondary reactions occurring along the anode casing peripheral edge.

23 Claims, 4 Drawing Sheets

ZINC/AIR CELL

FIELD OF THE INVENTION

The invention relates to a zinc/air cell having an anode comprising zinc and an air cathode. The invention relates to adding a protective metal layer onto the peripheral edge and also optionally onto the outside surface of a multiclad anode casing for zinc/air cell.

BACKGROUND

Zinc/air cells are typically in the form of a miniature button cells which have particular utility as batteries for electronic hearing aids including programmable type hearing aids. Such miniature cells typically have a disk-like cylindrical shape of diameter between about 4 and 12 mm and a height between about 2 and 6 mm. Zinc air cells can also be produced in somewhat larger sizes having a cylindrical casing of size comparable to conventional AAAA, AAA, AA, C and D size $Zn/MnO_2$ alkaline cells as well as rectangular/prismatic cells.

The miniature zinc/air button cell typically comprises an anode casing (anode cup), and a cathode casing (cathode cup). The anode casing and cathode casing each typically have a cup shaped body with integral closed end and opposing open end. After the necessary materials are inserted into the anode and cathode casings, the open end of the anode casing is typically inserted into the open end of the cathode casing with electrical insulating material therebetween and the cell sealed by crimping. The anode casing can be filled with a mixture comprising particulate zinc. Typically, the zinc mixture contains mercury and a gelling agent and becomes gelled when electrolyte is added to the mixture. The electrolyte is usually an aqueous solution of potassium hydroxide, however, other aqueous alkaline electrolytes can be used. The cathode casing contains an air diffuser (air filter) which lines the inside surface of the cathode casing's closed end. The air diffuser can be selected from a variety of air permeable materials including paper and porous polymeric material. The air diffuser is placed adjacent air holes in the surface of the closed end of the cathode casing. Catalytic material typically comprising a mixture of manganese dioxide, carbon and hydrophobic binder can be inserted into the cathode casing over the air diffuser on the side of the air diffuser not contacting the air holes. An ion permeable separator is typically applied over the catalytic material so that it faces the open end of the cathode casing against the anode material in a crimped cell.

The cathode casing can typically be of nickel plated stainless steel, for example, with the nickel plate forming the cathode casing's outside surface and stainless steel forming the casing's inside surface. The anode casing can also be of nickel plated stainless steel, typically with the nickel plate forming the casing's outside surface. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. The triclad (or other multiple clad) anode casing can be formed by plating one metal onto the other or more preferably by heat/pressure forming (cladding) one metal onto the other preferably before the casing has been shaped. An insulator material typically in the form of a ring or disk of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and electrolyte and after the air diffuser, catalyst, and ion permeable separator is placed into the cathode casing, the open end of the anode casing can be inserted into the open end of the cathode casing. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to improve inter-particle contact between zinc particles in the anode mixture. This in turn improves electrical conductivity within the anode and thus results in increased cell performance, for example, higher actual specific capacity of the zinc (Amp-hour/g). Also addition of mercury tends to reduce the hydrogen gassing which can occur in the zinc/air cell during discharge and when the cell is placed in storage before or after discharge. The gassing, if excessive, increases the chance of electrolyte leakage, which can damage or destroy the hearing aid or other electronic component being powered. It is desirable to reduce the amount of added mercury or eliminate adding mercury to the anode, since many regions around the world now restrict the use of mercury in electrochemical cells because of environmental concerns.

There can occasionally be creep of some electrolyte in the seal area provided between the anode and cathode casing thereby resulting in some electrolyte seepage from the cell. Such electrolyte seepage can occur regardless of whether mercury has been added to the anode. However, zinc/air cells that contain reduced amount of mercury, e.g. less than 3 percent by weight mercury based on the zinc or zero added mercury are generally more prone to gassing and such electrolyte creep. Seals have been provided wherein the insulating disk separating the anode and cathode casing has been coated on its inside surface (the insulator surface facing the anode casing) with an asphalt or polymeric sealant paste or liquid. However, this does not completely solve the problem of electrolyte creep between the anode and cathode casing in all circumstances. The electrolyte seepage can be promoted by surface imperfections on anode casing outer surfaces as well as the mating insulator surfaces. Misuse of the cell, that is, discharging the cell at higher current drain than intended can also promote excessive seepage.

The anode casing is typically formed of a triclad metal comprising a stainless steel body plated on the outside with a layer of nickel and on the inside with a layer of copper. The peripheral edge of the anode casing typically is clipped resulting in surface exposure of the three metals in very close proximity (within the thickness of the anode casing). It is believed that the exposure of the electrolyte to the different metals at the anode casing peripheral edge results in an electrochemical potential gradient causing surface reactions which in turn promotes electrolyte creep.

U.S. Pat. No. 3,897,265 discloses a representative zinc/air button cell construction with an anode casing inserted into the cathode casing. There is disclosed an insulator between the anode and cathode casings. The anode comprises zinc amalgamated with mercury. The cell includes an assembly comprising an air diffuser, cathode catalyst, and separator at the closed end of the cathode casing facing air holes in the surface of the cathode casing.

U.S. Pat. Nos. 5,279,905 and 5,306,580 disclose a miniature zinc/air cell wherein little or no mercury has been added to the anode mix. Instead, the inner layer of the anode casing has been coated with a layer of indium. The disclosed anode casing can be a triclad material composed of stainless steel plated on the outside surface with nickel and on the inside surface with copper. The copper layer is at least 1 microinch ($25.4 \times 10^{-6}$ mm). The reference discloses coating the copper layer on the anode casing's inside surface with a layer of indium. The indium layer is disclosed as being between about 1 microinch and 5 microinches ($25.4 \times 10^{-6}$ mm and $127 \times 10^{-6}$ mm).

SUMMARY OF THE INVENTION

The invention is applicable to a zinc/air cell, particularly a zinc/air button cell having an anode casing which in inserted into the open end of a cathode casing. The invention is applicable to anode casings which are multiclad, that is, formed of two or more layers of metals. The zinc/air button cells have particular application as batteries for hearing aids. The anode casing typically has a cylindrical shape having an integrally formed closed end and opposing open end. The anode casing thus forms a cup shape, which is filled with anode material comprising a mixture of zinc and alkaline electrolyte, preferably an aqueous solution of potassium hydroxide. The anode casing is inserted into the open end of a larger cup shaped cathode casing with insulating material therebetween. The anode casing is desirably formed of a tri-clad material comprising a stainless steel body which is plated on its outside surface with nickel and on the inside surface with copper. Thus, with such tri-clad the copper layer of the anode casing faces the anode material comprising zinc. The closed end of the cathode has air holes which allows air to pass through a catalytic layer comprising $MnO_2$, preferably a mixture of $MnO_2$ and carbon, within the cathode casing. Thus the zinc/air cell functions through electrochemical reaction wherein zinc oxidizes at the anode releasing electrons, while incoming oxygen at the cathode is reduced by absorbing electrons.

When the anode casing is formed of a multiclad metal, for example a triclad of nickel/stainless steel/copper, the peripheral edge of the anode casing has exposed along its surface each of the individual metals nickel, stainless steel, and copper in close proximity to each other, that is within the thickness of the anode casing, e.g. between about 0.001 inches and 0.015 inches (0.0254 mm and 0.38 mm). The close proximity of the exposed metal layers along the anode casing peripheral edge produces electrochemical potential gradients when in contact with electrolyte. Such potential gradient can cause secondary reactions which in turn can promote electrolyte creep along the outside surface of the anode casing, that is, between the anode and seal. The difference in hydrogen overpotential between these different metals is believed to be a significant contributor. In such circumstances electrolyte creep can occur despite the presence of tightly placed insulating material forming a seal between the anode and cathode casing.

A principal aspect of the invention is directed to reducing, preferably eliminating, the potential gradients at the peripheral edge of the anode casing caused by the use of a multi-clad anode casing. In accordance with the invention the exposed peripheral edge of the anode casing is plated with a protective metal , preferably selected from tin, indium, silver, copper, brass, bronze, phosphor bronze, silicon bronze, tin/lead alloy (alloy of the combination tin and lead) and gold. Desirably the protective metal can be tin, indium, silver or copper, more preferably tin or copper after the anode casing has been formed (post plating). The single metal is preferably pure elemental metal, but can also be an alloy containing tin, indium, silver, copper or gold, for example, brass (an alloy of copper and zinc) or bronze (an alloy of copper and tin) or an alloy of the combination tin and lead (Sn/Pb). The tin, indium, silver or copper, for example, can also be the principal component and the alloy metal can comprise preferably less than about 500 parts per million parts by weight of the total alloy. Metals which are essentially composed of tin, indium, silver, or copper comprising such small amount of alloy additive do not noticeably diminish the principal function of the protective metal, which is to markedly reduce, preferably eliminate, the potential gradient across the surface of the anode casing peripheral edge. Similarly, the protective metal can be composed of brass (an alloy of copper and zinc) or bronze (an alloy of copper and tin), phosphor bronze or silcon bronze or alloy of tin and lead (Sn/Pb). Such metals or metal alloys when applied homogenously over the peripheral edge of the anode casing essentially eliminate the potential gradient across said peripheral edge.

Thus, in a principal aspect of the invention, if the anode casing is formed of a multiclad, for example, the triclad nickel/stainless steel/copper, then the peripheral edge of the anode casing exposing each of these materials is post plated with a metal preferably tin, indium, silver copper, or gold more preferably tin or copper, brass, bronze, phosphor bronze or silicon bronze or tin/lead alloy. The protective metal should be applied so that its composition is homogeneous across the surface of the exposed peripheral edge of the anode casing and it is essentially pin-hole free to the extent practical. Preferably, the protective metal is applied to a thickness of between about 0.0001 and 0.015 mm. This in effect minimizes/eliminates the potential gradients caused by exposure of the individual (multiclad) metals along the peripheral edge of the anode casing and minimizes local gassing and hydroxyl ion $[OH]^-$ formation which are believed to enhance creep of electrolyte. In turn the problem of electrolyte seepage between the anode and cathode casing is thereby alleviated or eliminated altogether. The reduction of electrolyte leakage is accomplished by the present invention irrespective of whether the cell contains added mercury (e.g. containing between 1 and 3 percent by weight mercury) or is essentially mercury free (e.g. less than 100 parts mercury per million parts zinc). The effect is more pronounced and the efficacy of the current invention more easily observable in an essentially mercury-free battery.

In another aspect of the invention in addition to post plating the protective metal of the invention onto the exposed peripheral edge of the anode casing, such plating of the protective metal can also extend from said peripheral edge to also cover at least a portion and preferably all of the outside surface of anode casing abutting the insulating material between anode and cathode casing. Additionally, the protective metal of the invention can be applied to cover the entire outside surface of the anode casing including the clipped peripheral edge.

In another aspect it will be appreciated that the exposed peripheral edge of the anode casing and desirably at least a portion of the outside surface of the anode casing extending from said peripheral edge, can be plated with two or more layers of metals stacked one on top of the other. Such multiple layers can each be formed of the same or different metals, preferably selected from tin, indium, silver or copper, (or above discussed alloys thereof) or can be zinc as one of the intermediate layers or an alloy of tin and lead (Sn/Pb alloy) or can be alloys such as brass, bronze, phosphor bronze or silicon bronze. However, if multiple layers are applied it is desired that each layer be applied in a homogenous composition pin-hole free and preferably in an even thickness. This assures that there is no noticeable electrochemical potential gradient along the outer surface (last applied layer) of the protective metal. For example, the initial plating layer over the exposed triclad material can be silver. A layer of tin can then be plated over the silver. In such case each layer desirably has a thickness between about 0.0001 and 0.015 mm, for example, between about 0.0001 and 0.010 mm. The resulting effect is that the exposed surface of the anode casing peripheral edge is a single metal of homogenous composition, e.g. tin thereby reducing or eliminating the potential gradient along the surface said peripheral edge.

Another aspect is directed to post plating the exposed peripheral edge of the anode casing in accordance with the invention irrespective of whether the multiclad anode casing is formed of dual clad, triclad or quater (four) clad material. The invention is thus not intended to be limited to anode casing formed of a triclad material and is not intended to be limited to any specific metals which form the multiclad anode casing.

BRIEF DESCRIPTION OF THE DRAWINGS

The invention will be better understood with reference to the drawings in which.

DETAILED DESCRIPTION

Figure 1:
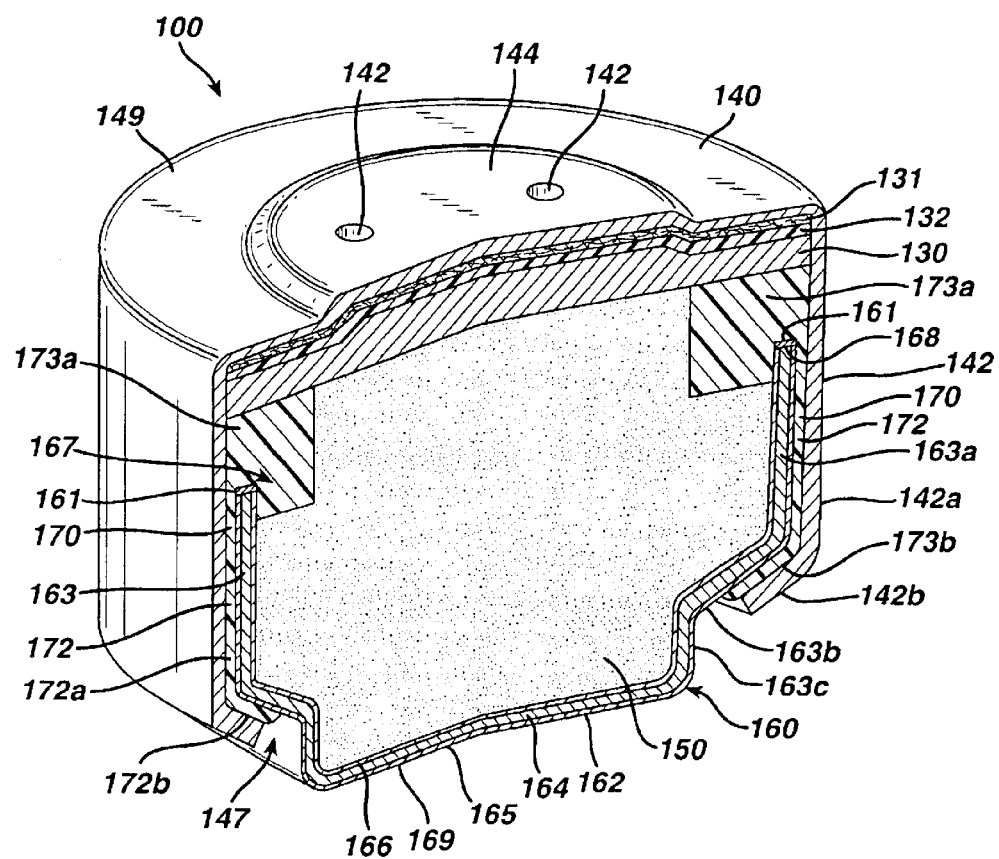
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention can include mercury, e.g of about 3 percent by weight or can have a reduced amount of mercury, e.g. between about 1 and 3 percent by weight. The zinc/air cell can also be essentially mercury free, that is, contains no added mercury (zero added mercury cell). In such case the zinc/air cell 100 of the invention has a total mercury content less than about 100 parts per million parts by weight of zinc in the anode, preferably less than 50 parts per million parts by weight of zinc in the anode. (The term "essentially mercury free" as used herein shall mean the cell has a mercury content less than about 100 parts per million parts by weight of zinc in the anode.) The zinc/air cell 100 is desirably in the form of a miniature button cell having an anode comprising zinc and an air cathode. The cell has particular application as a power source for electronic hearing aids. The miniature zinc/air cell 100 of the invention typically has a disk-like cylindrical shape of diameter between about 4 and 20 mm, preferably between about 4 and 12 mm and a height between about 2 and 10 mm, preferably between about 2 and 6 mm. The miniature zinc/air cell 100 typically has an operating load voltage between about 1.1 volt to 0.2 volt. The cell typically has a substantially flat discharge voltage profile between about 1.1 and about 0.9 volt whereupon the voltage can then fall fairly abruptly to a cut-off of about 0.2 volt. The cell can be discharged at a rate between about 4 and 15 milliAmp, or typically with a resistance load of between about 75 and 1500 Ohm. The term "miniature cells" or "miniature button cells" as used herein is intended to include such small size button cells, but is not intended to be restricted thereto, since other shapes and sizes for small zinc/air cells are possible for example for cellular telephone applications. For example, zinc air cells could also be produced in somewhat larger sizes having a cylindrical casing of size comparable to conventional AAAA, AAA, AA, C and D size $Zn/MnO_2$ alkaline cells, and even larger. The present invention is also intended to be applicable to such larger cell sizes and also to other cell shapes, for example, prismatic or elliptical shapes.

The zinc/air cell 100 of the invention can have a very small amount of lead additive in the anode. If lead is added to the anode, the lead content in the cell can typically be between about 100 and 1000 ppm of the zinc in the anode. However, the cell of the invention desirably can also be essentially lead free, that is, the total lead content can be less than 30 ppm, desirably less than 15 ppm of the zinc content of the anode.

The zinc/air cell 100 of the invention has an anode casing 160, a cathode casing 140, and electrical insulator material 170 therebetween. The anode casing 160 has a circumventing body 163, an integral closed end 169, and an opposing open end 167. The cathode casing 140 has a circumventing body 142, an integral closed end 149 and an opposing open end 147. The anode casing 160 contains an anode mixture 150 comprising particulate zinc and alkaline electrolyte. The cathode casing 140 has a plurality of air holes 142 in its surface at the closed end thereof. A cathode assembly 130 comprising a catalytic composite material 134 (FIG. 2) can be placed within casing 140 and proximate to the air holes. During cell discharge, the catalytic material 134 facilitates the electrochemical reaction with ambient oxygen as it ingresses through air holes 142 and reacts with electrolyte.

The invention is particularly applicable to a zinc/air cell 100 having an anode casing 160 comprising a multiclad metal body, which is preferably a triclad metal. In a preferred embodiment shown in FIGS. 1 and 3 the anode casing 160 is formed of a triclad metal comprising a stainless steel body 164 which is plated with a layer of nickel 162 forming the casing outside surface and with a layer of copper 166 forming the casing inside surface. Thus, in the preferred embodiment the zinc/air cell 100 has an anode casing 160 comprising individual layers of the triclad metals nickel 162, stainless steel 164, and copper 166, referred to in shorthand notation as nickel/stainless steel/copper (Ni/SS/Cu). In such notation it will be understood that the first appearing metal (Ni) represents the casing outside surface and the last (Cu) represents the casing inside surface. The copper layer 166 desirably has a thickness between about 0.0002 inches (0.005 mm) and 0.002 inches (0.05 mm). The stainless steel typically has a thickness between about 0.001 inches (0.0254 mm) and 0.01 inches (0.254 mm) and the nickel layer between about 0.0001 inches (0.00254 mm) and 0.001 inches (0.0254 mm). The total wall thickness of the anode casing 160 composed of such multiclad metal can be desirably between about 0.001 inches (0.0254 mm) and 0.015 inches (0.38 mm). The anode casing 160 has a peripheral edge 168 (FIGS. 1 and 3) which is clipped so that all three of the triclad material are exposed along the surface of the edge. Specifically, peripheral edge 168 is the only portion of the anode casing 160 which has exposed in the same plane or same portion of continuous surface all three of the triclad metalsTo enhance the seal between insulating disk 170 and anode casing 160 there can be applied a liquid sealant material to the inside surface of the insulator wall 172 which faces the anode casing outside surface 162. A conventional water resistant sealing paste such as an asphalt based sealant, e.g., comprising bitumen and a suitable aromatic solvent, e.g. toluene can be employed. Conventional polymeric sealants can also be employed, for example, a solution of polyamide in alcohol or other solvent. The sealing paste or liquid can be applied to the inside surface of insulator wall 172 before the anode casing 160 is inserted into the open end 147 of the cathode casing 140.

Figure 3:
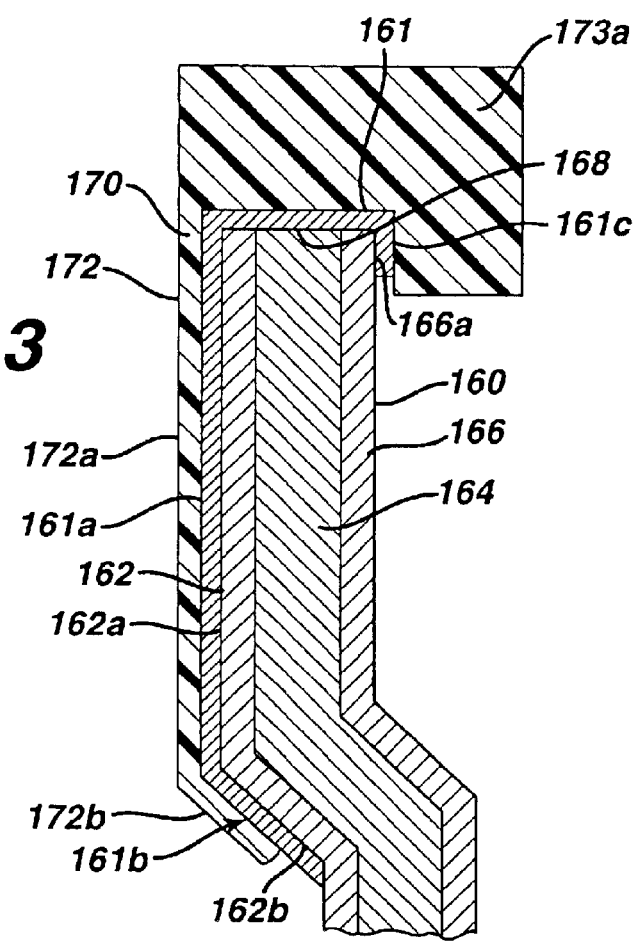
FIG. 3 is a cross sectional view of an embodiment showing the protective metal of the invention plated onto the peripheral edge and outside surface of the anode casing.

In accordance with a specific embodiment a protective metal 161 is post plated onto the exposed tri-clad peripheral edge 168 of anode casing 160 as shown in FIGS. 1 and 3. The term "post plating" as used herein shall mean that the plating of edge 168 with protective metal 161 is accomplished after the multiclad sheeting comprising metal layers 162, 164 and 166 which forms the anode casing 160 has been formed. The post plating thus can also include plating at least a portion of the outer surface 162 of anode casing 160 with the protective metal 161 in addition to plating said peripheral edge 168 with the protective metal 161. Optionally, the inner surface 166 can be post plated with protective metal 161 simultaneously during plating of peripheral edge 168, preferably with the same protective metal 161. Preferably, the post plating is accomplished after the anode casing has been shaped into its final form, e.g. as shown in FIG. 1. The protective metal 161 is desirably selected from the elemental metals tin, indium, silver, copper or gold but can also be an alloy such as brass , bronze, phosphor bronze or silicon bronze or a tin/lead alloy. Preferably, the edge 168 is plated with copper or tin. The single metal can also be an alloy of tin, indium, silver, or copper comprising less than about 500 parts per million parts by weight of the alloy material. A protective metal 161 of tin, indium, silver or copper comprising such small amount of alloy additive (also brass or bronze) does not noticeably diminish the principal function of the protective metal, which is to eliminate the potential gradient across the surface of the anode casing peripheral edge 168. The plating of protective metal 161 onto peripheral edge 168 is preferably accomplished after the anode casing 160 has been formed. The protective metal 161 is preferably applied so that is pin-hole free, of homogenous composition and uniform thickness over peripheral edge 168. The protective metal 161 is preferably applied so that it also extends continuously from the peripheral edge 168 to cover at least a portion and preferably all of the outside nickel surface 162 of anode casing 160 which abuts insulator wall 172 as shown in FIG. 3. It will be appreciated that protective metal 161 can also be applied to the inside surface 166 of anode casing 160, preferably simultaneously during its application to peripheral edge 168.

Protective metal layer 161 is applied so that it adheres to and covers all of peripheral edge 168. Metal layer 161 can be applied, for example, by solution coating (electroless) or more preferably by electroplating. The plating can also be accomplished by other methods, for example, by vacuum deposition such as sputtering. (The term "plating" as used herein and the claims shall be understood to include such electroplating, solution coating, or vacuum deposition.) Preferably the metal layer 161 can be applied to cover peripheral edge 168 with a portion 161a (FIG. 3) of protective metal layer 161 also continuously extending to cover at least a significant portion of the downwardly extending leg 162a of the anode casing outer surface 162, e.g., covering at least about 25% of the portion of downwardly extending leg 162a immediately adjacent peripheral edge 168. Preferably, metal layer 161 can continuously extend from peripheral edge 168 to also cover enough of the outside surface 162 of the anode casing 160 so that there is no portion of insulator wall 172 which directly contacts the anode casing outside surface 162. Additionally, protective metal layer 161 can also extend further forming portion 161b which is plated onto slanted leg 162b of the anode casing outside surface 162. In such case as shown in FIG. 3 the protective metal layer 161 comes between the anode casing outside surface 162 and insulator 170 so that no portion of the downwardly extending insulator wall 172 comes in direct contact with outside surface 162 of the anode casing. Alternatively, the protective metal 161 can be post plated onto the entire outside surface 162 of anode casing 160 including the portion at closed end 169. Optionally, protective metal layer 161 can also be simultaneously applied to the inside surface 166 of anode casing 160.

The protective metal 161 should be applied so that its composition is homogeneous across the surface of the exposed peripheral edge 168 of the anode casing. Preferably the protective metal is applied to a thickness of between about 0.0001 and 0.015 mm. For example, the protective metal can desirably be applied to a thickness of between about 0.002 and 0.004 mm. This in effect minimizes/eliminates the potential gradients caused by exposure of the triclad material to electrolyte along the peripheral edge 168 of the anode casing.

The exposed peripheral edge 168 of the anode casing and desirably at least a portion of the outside surface 162 of the anode casing extending from said peripheral edge, can be plated with two or more layers of protective metals 161 stacked one on top of the other. Such multiple layers can each be formed of the same or different metals, preferably selected from tin, indium, silver or copper (or above referenced alloys thereof, for example brass or bronze). However, if multiple layers are applied, it is desired that each layer be applied in a homogenous composition and preferably in an even thickness. This assures that there is no noticeable electrochemical potential gradient along the outer surface (last applied layer) of the protective metal 161. If two or more layers of protective metal 161 are employed, each layer can desirably have a thickness between 0.0001 mm and 0.015 mm, for example, between about 0.0001 and 0.010 mm.

By post plating peripheral edge 168 with protective metal 161, creep of electrolyte which can occur between the insulating seal 170 and the outside surface 162 can be reduced or eliminated. As above described it is preferable to post plate peripheral edge 168 and also enough of the outside surface 162a and 162b of the anode casing (FIG. 3) so that there is no portion of the insulator 170 or insulator wall 172 which directly contacts the anode casing outside surface 162. The post plating of the protective metal 161 in such manner prevents electrolyte creep (electrolyte seepage)

which can sometimes occur despite the use of a sealant paste or sealant liquid which can be applied to the inside surface of insulator wall 172 as above described. A reduction in electrolyte seepage is obtained when the protective metal 161 is applied to the anode casing peripheral edge 168, and preferably also to the outside surface of casing 162 as above described, even when the control cell contains zero added mercury. (A zero added mercury zinc/air cell has a mercury content less than about 100 parts per million parts by weight of zinc in the anode, desirably less than 50 parts per million parts by weight of zinc in the anode.)

Electrolyte creep, which the present invention seeks to alleviate, is promoted by capillary forces and electrochemical potential gradients. These in turn, are influenced by the presence of oxygen or water and the catalytic activity and surface properties of the metal in question and presence or absence of hydroxyl ions. The tri-clad metals nickel, stainless steel and copper are at slightly different electrochemical potentials and are exposed in very close proximity at the anode casing peripheral edge 168. Because of the differences in hydrogen overpotential of these metals, exposure of the tri-clad metal to electrolyte is believed to promote the following surface reactions which produce hydroxyl ions (OH$^-$). The local production of hydroxyl ions in turn are believed to promote electrolyte creep. (The oxygen ingresses into the cell through air holes 142 and the H$_2$O is present in the electrolyte.)

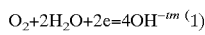

$$O_2+2H_2O+2e=4OH^{-im} \quad (1)$$

$$2H_2O+2e=2OH^-+H_2 \quad (2)$$

Reaction scheme (2) occurring near the clipped edge at the exposed metal surfaces at the anode potential can generate OH-ions which can locally enhance creep of electrolyte. In accordance with the invention a solution to the problem is to reduce the potential gradient at the anode casing edge 168 caused by the exposed triclad material. It has been determined that this is effectively accomplished by plating edge 168 of anode casing 160 with a single metal which can desirably be selected from tin, indium, silver, copper or gold, preferably, tin or copper. The rate of reaction (2) at the surface of exposed edge 168 is thereby reduced and electrolyte creep is diminished, if not entirely eliminated irrespective of anode composition. (For example, irrespective of whether mercury has been added to the zinc anode.)

Although the anode casing 160 is preferably formed of a triclad material, e.g. nickel/stainless steel/copper the invention is not intended to be restricted to anode casing composed of such combination. For example, it will be appreciated that the anode casing can be formed of other types of multiclads for example, dual (two) clad material, for example, stainless steel plated on the inside surface with indium or copper. Alternatively, the anode casing 160 could be formed of a quater (four) clad nickel/stainless steel/ copper/indium. The protective metal 161 of the invention is thus equally applicable to anode casing 160 formed of such dual or quater (four) clad materials and can be applied to the peripheral edge 168 and preferably also to outside surfaces 162$a$ and 162$b$ of the anode casing, regardless of whether the anode casing is dual, tri or quater clad.

Figure 4:
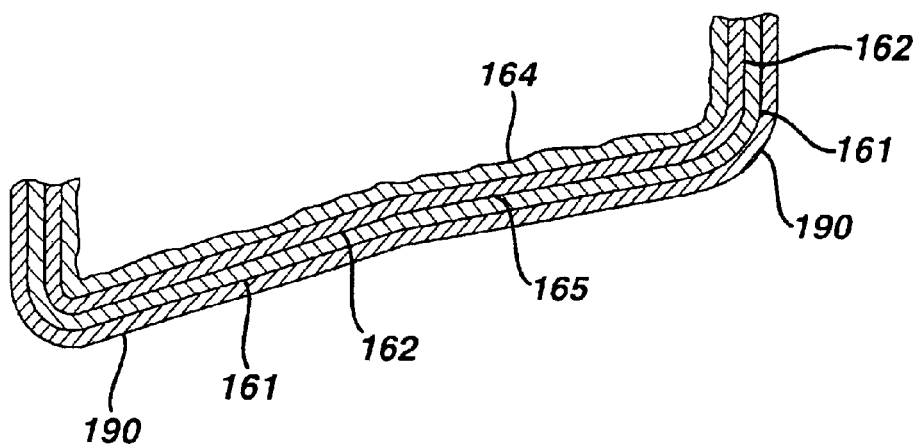
FIG. 4 is a partial cross sectional view of an embodiment of the anode casing showing the protective metal plated onto the exposed closed end thereof.

Optionally, as above referenced, the entire outside surface 162 of anode casing 160, that is, including the exposed negative terminal surface 165 can be post plated with the protective metal 161. Such post plating of negative terminal surface 165 with protective metal 161 is shown in FIG. 4. If the exposed negative terminal surface 165 of anode casing 160 is post plated with the protective metal 161, then the exposed terminal surface 165 can also be overplated with an anticorosive material 190 after the protective metal 161 has been applied thereto as shown in FIG. 4. Such anticorosive material 190, desirably gold, nickel, or tin provides assurance that the exposed terminal surface 165 does not tarnish. It also can improve the appearance (enhanced cosmetic effect) and can facilitate electrical contact at anode terminal surface 165. In particular, if the protective metal 161 is copper and the copper is plated onto exposed terminal surface 165, then it would be desirable to overplate the copper with a layer of gold, nickel or tin to prevent the copper from tarnishing. In this manner the cell's aesthetic appearance will be preserved during the useful life of the cell. In a specific embodiment, if the anode casing 160 is a triclad nickel 162/stainless steel 164/copper 166 then a protective metal 161 can be plated onto the entire outside surface of the anode casing including peripheral edge 168. An anticorosive metal 190, e.g. gold, nickel or tin, can then subsequently be plated onto the protective layer 161 at the exposed terminal surface 165 as shown in FIG. 4. Other anticorosive metals such as chromium, platinum, palladium, brass or bronze could also be used as the anticorosive metal to be plated onto protective layer 15$a$ at the exposed terminal surface 165 of cell 100.

Figure 5:
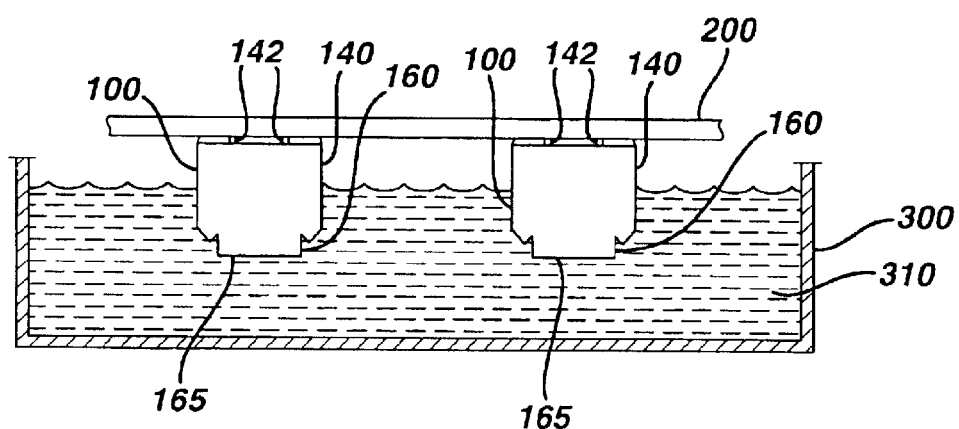
FIG. 5 is a schematic diagram showing zinc/air button cells being immersed in electrolysis plating bath.

In the embodiment (FIG. 4) wherein the protective metal 161 is plated onto exposed negative terminal surface 165, an anticorosive metal 190 can be subsequently applied over the protective metal 161 at the exposed negative terminal surface 165. A suitable method for applying the anticorosive material is described in U.S. Pat. No. 4,364,800, herein incorporated by reference, which deals with insitu plating of a cell surface. The reference does not specifically contemplate the plating of the casing surfaces of a zinc/air button cell. The method described in this reference can be sufficiently modified to allow the insitu plating of the exposed negative surface of a zinc/air button cell. Thus, an anticorosive metal 190 can be plated onto exposed negative terminal surface 165 which may have been preplated with the protective metal 161 above described. It is observed that at the end of assembly of the small zinc/air button cells, the air holes 142 are normally covered with an adhesive tape which typically extends to cover the air holes 142 of a multiplicity of like cells. It has been determined that the exposed negative terminal 165 of small zinc/air button cells can be overplated by an anticorosive metal by first removing said tape for a brief period of about two to three minutes to allow enough air to enter the cell and then re-covering the air holes with the same or another tape 200 (FIG. 5). Adhesive tape 200 can be applied over the air holes 142 of a plurality of cells 100 that have been briefly exposed to air in this manner. The cells held by tape 200 can then be immersed into a plating bath 310 housed within a holding vessel 300 as shown in FIG. 5. The cells 100 are immersed into bath 310 to a sufficient depth so that at least a portion of the exposed anode casing, that is, anode terminal 165 and at least a portion of the cathode casing 140 contacts the plating bath. This completes and electrical circuit between the anode and cathode of cell 100. The top portion of the cathode casing 140 containing air holes 142 should not be immersed into plating bath 310, since some of the plating bath could then seep into air holes 142 and destroy the cell. Since a small amount of air was let into the cell, the cell is active. The active cell therefore becomes a direct current power source at a voltage of about 1.48 Volts, which is enough to drive electrolysis resulting in the plating of anticorosive metal from the bath onto the cell's anode terminal surface 165. It will be appreciated that there is a small amount of air that seeps into the cell through air holes 142 during cell assembly. Thus, if the cells are immersed in bath 310 soon after cell assembly, the cells can be sufficiently active to drive the electrolysis without the need to allow additional air to enter the cell by briefly removing the assembly tape covering air holes 142. This technique has particular application in connection with the embodiment of the present invention wherein the exposed negative terminal surface 165 was first plated with the protective metal 161 during the plating of peripheral edge 168 of the anode casing 160. The protective metal 161 at the exposed negative terminal surface 165 can then be overplated with an anticorosive metal by emptying the above described method as described with reference to FIG. 5.

As described in U.S. Pat. No. 4,364,800 a gold anticorosive metal can be plated onto a negative cell surface by preparing the electyrolysis bath with a gold plating solution which containing about 2 grams per liter of gold metal. A desirable gold plating solution can be a basic solution of a sulfite complex of gold, such as the one available under the trade designation ECF-61 cyanide free gold plating solution from Englehard Minerals and Chemical Corporation. With respect to the zinc/air cell 100 an anticorosive layer 190 of gold can be applied over protective metal 161, for example, over a protective metal 161 of copper at exposed terminal surface 165 by dipping the cell surface 165 of cell 100 into the plating bath 310. The plating bath 310 can be composed of a solution of the above described sufite complex of gold while keeping the solution under a pH of about 8.5 and 11. The cell 100 can be suspended from a tape 200 so that the exposed terminal surface 165 and at least a portion of the cathode casing 140 is immersed in the plating bath 310. The cell becomes active and drives an electrolysis plating reaction. During electrolysis which occurs under these conditions a gold anticorosive layer 190 will deposit over the protective metal 161, e.g copper, at the exposed terminal surface 165 of anode casing casing 160.

Alternatively, the protective metal 161, for example, a protective metal 161 of copper on exposed terminal surface 165 can be overplated with a anticorosive layer of tin to prevent corrosion of the protective metal 161. Surface 165 plated with protective metal 161, e.g. copper, can first be cleaned by washing it in a soap solution. The washing is preferably carried out for about one minute at a temperature of about 65° C. in a soap solution of liquid electro-cleaner sold under the trade designation ENPREP 250 from Enthone-OMI Company. The washed surface 165 can be further prepared (etched) by immersing it in an acid solution of 10 vol.% $H_2SO_4$ or 5 vol % $HNO_3$ for a brief period of about 15 seconds at room temperature of about 22° C. The cell containing treated terminal surface 165 can then be immersed in electrolysis plating bath 310 (FIG. 5) by the method above described for plating an anticorosive metal onto terminal surface 165. The plating bath desirably contains a solution of 37.5 g/l of stannous sulfate in aqueous solution of sulfuric acid (9 vol % pure sulfuric acid), 18 ml/liter of an acid tin brightener available under the trade designation SOLDEREX TBA (Enthone-OMI Company) and 9 ml/liter SOLDEREX TB-B brightener (Enthone-OMI Company). The electrolysis is desirably carried out at room temperature of about 22° C. by immersing the exposed terminal surface 165 (and also a portion of the cathode casing 140) of the cell 100 in the plating solution for about 2 to 3 minutes as shown and described with reference to FIG. 5. The cell 100 (FIG. 5) is sufficiently active to drive the electrolysis plating reaction. In this manner an anticorosive layer of tin plates onto exposed negative terminal surface 165 of anode casing 160 thereby overplating the protective layer 161, e.g. of copper, earlier applied to said surface.

A preferred embodiment of a zinc/air cell of the invention is shown in FIG. 1. The embodiment shown in FIG. 1 is in the form of a miniature button cell. The cell 100 comprises a cathode casing 140 (cathode can) an anode casing 160 (anode can) with an electrical insulator material 170 therebetween. The insulator 170 can desirably be in the form of a ring which can be inserted over the outside surface of the anode casing body 163 as shown in FIG. 1. Insulator ring 170 desirably has an enlarged portion 173a extending beyond peripheral edge 168 of the anode casing (FIG. 1). The insulator 170 with enlarged portion 173a prevents anode active material from contacting the cathode casing 140 after the cell is sealed. Insulator 170 is of a durable electrically insulating material such as high density polyethylene, polypropylene or nylon which resists flow (resists cold flow) when squeezed.

The anode casing 160 and cathode casing 140 are initially separate pieces. The anode casing 160 and cathode casing 140 are separately filled with active materials, whereupon the open end 167 of the anode casing 160 can be inserted into the open end 147 of cathode casing 140. The anode casing 160 is characterized by having a first straight body potion 163a of maximum diameter which extends vertically downwardly (FIG. 1) from peripheral edge 168 to a point which is more than at least 50% of the anode casing 160 height whereupon the casing is slanted inwardly to form slanted midportion 163b. There is a second straight portion 63c extending vertically downwardly from the terminal end of midportion 63b. The second straight portion 163c is of smaller diameter than straight portion 163a. The portion 163c terminates with a 90° bend forming the closed end 169 having a relatively flat negative terminal surface 165. The body 142 of cathode casing 140 has a straight portion 142a of maximum diameter extending vertically downwardly from closed end 149. The body 142 terminates in peripheral edge 142b. The peripheral edge 142b of cathode casing 140 and underlying peripheral edge 173b of insulator ring 170 are initially vertically straight and can be mechanically crimped over the slanted midportion 163b of the anode casing 160. This locks the cathode casing 140 in place over the anode casing 160 and forms a tightly sealed cell.

Anode casing 160 can be separately filled with anode active material by first preparing a mixture of particulate zinc and powdered gelling agent. The zinc used to form the mixture can be pure particulate zinc or can also be in the form of particulate zinc alloyed with indium (100 to 1000 ppm). Said zinc can also be in the form a particulate zinc alloyed with indium (100 to 1000 ppm) and bismuth (100 to 1000 ppm). Other alloys of zinc, for example, particulate zinc alloyed with indium (100 to 1000 ppm) and lead (100 to 1000 ppm) can also be used as the starting (original zinc) materials. These particulate zinc alloys are essentially comprised of pure zinc and have the electrochemical capacity essentially of pure zinc. Thus, the term "zinc" shall be understood to include such materials.

The gellant material can be selected from a variety of known gellants which are substantially insoluble in alkaline electrolyte. Such gellants can, for example, be cross linked carboxymethyl cellulose (CMC); starch graft copolymers (e.g. hydrolyzed polyacrylonitrile grafted unto a starch backbone available under the designation Waterlock A221 from Grain Processing Corp.); cross linked polyacrylic acid polymer available under the designation Carbopol C940 (B.F. Goodrich); alkali saponified polyacrylonitrile available as Waterlock A400 (Grain Processing Corp).; and sodium salts of polyacrylic acid, e.g., sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 50 can be inserted into the anode casing 60. Alternatively, the dry powder mix of particulate zinc and gellant can be first placed into the anode casing 60 and the electrolyte solution added to form the wet anode mixture 50.

Figure 2:
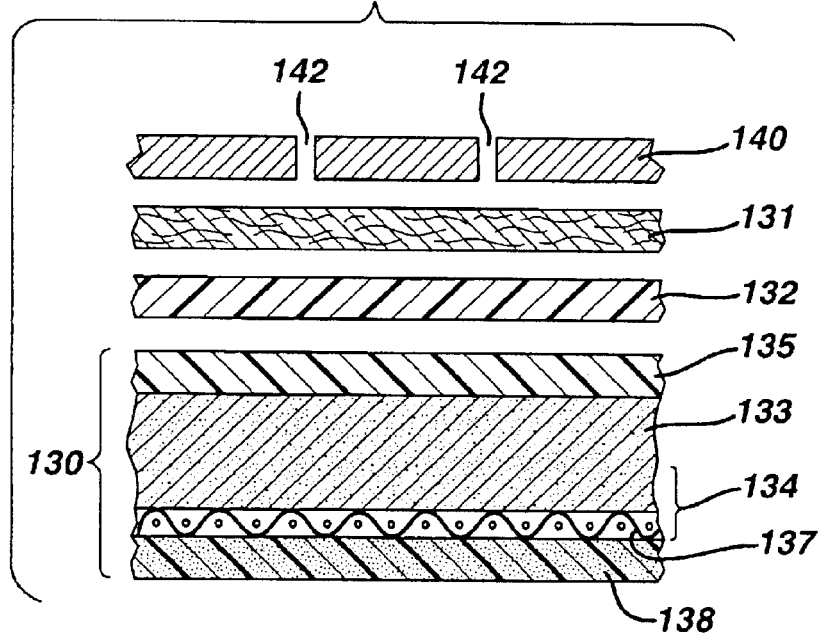
FIG. 2 is an exploded view of the catalytic cathode assembly and air diffuser referenced in FIG. 1.

A catalytic cathode assembly 130 and air diffuser 131 can be inserted into casing 140 as follows: An air diffuser disk 131 (FIGS. 1 and 2), which can be in the form of an air porous filter paper or porous polymeric material can be inserted into the cathode casing 140 so that lies against air holes 142. A separate electrolyte barrier layer 132 (FIGS. 1 and 2), for example, of polytetrafluroethylene (Teflon) can optionally be inserted over the air diffuser 131. The barrier layer 132, if employed, should be hydrophobic and desirably functions to prevent electrolyte from leaking from the cell without significantly retarding the inflow of air into the cell. A catalytic cathode assembly 130 as shown in FIG. 2 can be prepared as a laminate comprising a layer of electrolyte barrier material 135, a layer of cathode catalyst composite 134 under the barrier layer 135 and a layer of ion permeable separator material 138 under the catalyst composite 134, as shown in FIG. 2. Each of these layers can be separately prepared and laminated together by application of heat and pressure to form the catalytic assembly 130. The electrolyte barrier layer 135 can desirably be of polytetrafluroethylene (Teflon). The separator 138 can be selected from conventional ion permeable separator materials including cellophane, polyvinylchloride, acrylonitrile, microporous polypropylene and polyethylene.

Catalytic cathode composite 134 desirably comprises a hydrophobic catalytic cathode mixture 133 of particulate manganese dioxide, carbon, and hydrophobic binder which is applied by conventional coating methods to a surface of an electrically conductive screen 137, preferably a nickel mesh screen. During application the catalytic mixture 133 is substantially absorbed into the porous mesh of screen 137. The manganese dioxide used in the catalytic mixture 133 can be conventional battery grade manganese dioxide, for example, electrolytic manganese dioxide (EMD) or $MnO_2$ obtained from in-situ oxidation of manganous nitrate. The carbon used in preparation of mixture 133 can be in various forms including graphite, carbon black and acetylene black. A preferred carbon is carbon black because of its high surface area. A suitable hydrophobic binder can be polytetrafluroethylene (Teflon). The catalytic mixture 133 may typically comprise between about 3 and 10 percent by weight $MnO_2$, 10 and 50 percent by weight carbon, and remainder binder. During cell discharge the catalytic mixture 33 acts primarily as a catalyst to facilitate the electrochemical reaction between the incoming air and electrolyte. However additional manganese dioxide can be added to the catalyst and the cell can be converted to an air assisted zinc/air cell. In such cell at least a portion of manganese dioxide becomes discharged, that is, some manganese is reduced during electrochemical discharge along with incoming oxygen.

The individual layers, namely barrier layer 135, catalyst composite 134, and separator 138 can be laminated by application of heat and pressure to form the catalytic assembly 130 shown in FIG. 2. Assembly 130 can be inserted into the cathode casing 140 so that it abuts air diffuser 131 with separator layer 138 facing the open end of casing 140, as shown in FIG. 1. After the air diffuser 131 and catalytic assembly 130 are inserted into casing 140, the open end 167 of the filled anode casing 160 can be inserted into the open end 147 of cathode casing 140. The peripheral edge 142b of the cathode casing can be crimped over the slanted midportion 163b of the anode casing with insulator 170 therebetween, as above described.

In the preferred embodiment (FIG. 1) the anode casing 160 has a layer of copper 166 plated or clad on its inside surface so that in the assembled cell the zinc anode mix 150 contacts the copper layer. The copper plate is desired because it provides a highly conductive pathway for electrons passing from the anode 150 to the negative terminal 165 as the zinc is discharged. The anode casing 160 is desirably formed of stainless steel which is plated on the inside surface with a layer of copper. Preferably, anode casing 160 is formed of a triclad material composed of stainless steel 164 which has been clad on its inside surface with a copper layer 166 and on its outside surface with a nickel layer 162 as shown in FIG. 3. Thus, in the assembled cell 100 the copper layer 166 forms the anode casing inside surface in contact with the zinc anode mix 150 and the nickel layer 162 forms the anode casing's outside surface. In accordance with a preferred embodiment of the invention a protective metal layer 161, preferably consisting essentially of an elemental metal selected from tin, indium, silver, copper, gold, brass, or bronze, phosphor bronze or silicon bronze or tin/lead alloy is plated onto the anode casing peripheral edge surface 168. Such plating covers the triclad metals nickel 162, stainless steel 164 and copper 166 (or other multiclad layers forming the anode casing 160) exposed at this surface. Preferably, the protective metal layer 161 is also applied (portions 161a and 161b shown in FIG. 3) to the region of the anode casing outside surface 162 abutting insulator wall 172. In such case the insulator wall 172 will directly contact protective metal layer 161 (portions 161a and 161b) which comes between insulator wall 172 and anode casing surface 162. The plating of peripheral edge 168 and preferably also the outside surface 162 with the protective metal layer 161 has been determined to reduce the chance of electrolyte leakage from the cell.

The anode mixture 150 containing the metal binder of the invention can be prepared in the following manner for a zinc/air cell 100 (size 13) having an overall diameter of about 7.75 mm and a height (positive to negative terminal) of 5.3 mm. A metal binder of indium and bismuth alloy (In/Bi) can be heated in a crucible to a temperature above its melting point in order to liquify the metal binder. A preferred indium/bismuth metal alloy binder has a weight ratio of indium to bismuth of about 66/34 and a melting point of about 72° C. The hot liquified metal can then be added to a dry zinc powder. The zinc powder can be in the form of particulate zinc alloyed with about 100 to 1000 ppm indium and 100 to 1000 ppm indium. A hot mixture of the zinc powder and liquified metal binder is formed. The mixture can then be transferred to a rotating vat (tumbler), for example, to a rotating quartz tube furnace and heating of the mixture continued therein at a temperature between about 100° C. and 200° C. for a period of time while rotating the vat. (The heating temperature between 100° C. and 200° C. is above the melting point of the indium/bismuth metal binder and below the melting point of the particulate zinc.) The heating is carried out preferably in an inert atmosphere of nitrogen or argon to prevent oxidation of the zinc. The mixture is rotated in the vat while heating for a period of about 10 to 30 minutes until a homogenous mixture is obtained. During this period the liquified metal binder coats at least a portion of the individual zinc particles. The mixture is then gradually cooled to ambient temperature, preferably while continuing to rotate the mixture in the vat. As the mixture cools the metal binder solidifies and causes individual zinc particles to bind to each other forming discrete zinc agglomerates. The agglomerates can typically contain between about 2 and 500 (or greater) of individual zinc particles held bound to each by the metal binder solidified and adhered to the individual zinc particles.

A suitable gelling agent can then be added to the mixture of zinc agglomerates. The resulting mixture is then stirred and can be inserted into the anode casing 160. Electrolyte solution, preferably an aqueous solution comprising potassium hydroxide can then be added to the mixture in the anode casing 160 to form a gelled anode mixture 150.

In a specific embodiment the cell 100 can have an overall diameter of about 0.305 inches (7.75 mm) and a height (positive to negative terminal) of about 0.207 inches (5.26 mm). This size cell is recognized in the commercial art as a 13-size cell and is equivalent to the International Electrochemical Commission (IEC) "PR48" size cell. The anode mixture 150 can have the following composition: Zn (78.56 Wt. %); Gelling Agent Waterlock J-550 (0.26 Wt. %); Aqueous KOH electrolyte (19.61 Wt. %). The zinc can have an average particle size between about 30 and 350 micron as measured by passing the zinc through a sieve. The zinc can be pure or, essentially pure, for example, can be in the form of particulate zinc alloyed with bismuth (100 to 1000 ppm) and indium (100 to 1000 ppm). The aqueous electrolyte can be an aqueous mixture of 35 wt. % KOH and 2 wt. % ZnO. The anode 150 can contain mercury at about 3 percent by weight zinc. However, anode 150 can also be prepared with zero added mercury (mercury content was less than 100 ppm of zinc weight). The anode mixture 150 inserted into anode casing 160 can contain about 0.37 g zinc.

The cathode catalyst composite 137 can have the following composition: $MnO_2$ (EMD) 4.6 wt. %, carbon black 15.3 wt %, Teflon binder 18.8 wt. %, and nickel mesh screen, 61.2 wt. %. The total cathode catalyst composite 137 can be 0.140 g.

The benefit of the invention can be demonstrated by the following examples.

EXAMPLE 1

(With Zero Added Mercury and Entire Anode Casing Surfaces Plated with Different Protective Metals A miniature zinc/air cell was prepared having the components as above described (FIG. 1). The test cells were fabricated as size 13 zinc/air cells having a cell diameter of 0.305 inches (7.75 mm) and height of 0.207 inches (5.26 mm). The zinc/air size 13 cell is equivalent to the International Electrochemical Commission (IEC) "PR48" size cell.

The cathode casing 140 of each test cell was of nickel plated steel having a total thickness of 0.004 inches (0.102 mm). A catalytic cathode composite 134 was inserted into the cathode casing 140 of the above indicated size 13 test cells. The catalytic cathode composite 34 had the following overall composition: $MnO_2$ 4.6 wt. %, carbon black 15.3 wt. %, Teflon binder 18.8 wt. %, and nickel plated steel sheet, 61.2 wt. %. The total catalytic cathode composite 34 including the nickel plated steel mesh was 0.034 grams.

The anode casing 160 was of triclad material of stainless steel 164 with a layer 162 of nickel on the outside and layer 166 of copper on the inside as shown and described with reference to FIGS. 1 and 3. The anode casing 160 had a total thickness of 0.004 inches (0.102 mm). The copper layer was 0.00028 inches (0.00711 mm), the stainless steel layer was 0.00364 inches (0.0925 mm), and the nickel layer was 0.00008 inches (0.00203 mm).

The triclad anode casings 160 surfaces were plated with a variety of different protective metals as shown in Table 1 at a nominal thickness of 4 microns. All of the surfaces of the anode casing, that is, the entire outside surfaces 162 (including sidewalls and terminal surface 165) and entire inside surface 166 including also peripheral edge 168 of the anode casing 160 were all plated with the protective metals. All of the anode cans were plated employing electrolytic barrel plating where the barrel was rotated at approximately 30 rpm.

The method of electrolytic barrel plating is itself a conventional method described in texts such as *Modern Electroplating* by F. A. Lowenheim (John Wiley and Sons, New York, 1974) and the *Metal Finishing Guidebook and Directory* (Metal Finishing, Elsevier Publishing, New York, 1992). This technique involves placing a batch of the anode casings into a rotating barrel containing the plating solution and providing the necessary electrolytic contact to the anode casing causing the plating metal to deposit onto the immersed surface of the anode casing.

The plating process consisted of the following general steps:

(1) Washing in an alkaline soap solution followed by rinsing
(2) Dipping in commercial "activating" solution followed by rinsing
(3) Acid etch followed by rinsing
(4) Electrolytic barrel plating followed by rinsing
(5) Spin drying Steps 2 and 3 can optionally be combined, depending on the metals plated.

In the case of copper plated anode casings 160, the plating steps may be followed by a heat treatment. Said heat treatment is accomplished by passing reducing gas (95 wt. % nitrogen and 5 wt. % hydrogen) over the anode casing in a quartz furnace at 500° C. for 20 minutes. As will be shown by the accompanying data, a plated copper layer heat treated in this manner can be especially beneficial for minimizing and eliminating crimp leakage.

Next, the casings were pushed into a nylon insulator grommet coated with a polyamide based liquid sealant on its inside surface. Prior to this assembly process, the nylon insulators were coated with a polyamide based hotmelt adhesive via tumbling in an oven to further retard leakage.

An anode mixture 150 was inserted into the plated and in the case of copper, heat-treated, anode casing 160 of the above indicated size 13 test cells. The anode mixture 150 (with zero added mercury) was prepared as follows. All groups of cells had an anode mixture comprising particulate zinc which was an alloyed with 500 ppm Pb, 500 ppm In, and 80 ppm Al. An indium/bismuth (InBi) binder was added to the zinc anode. The binder improves electrical conductivity and reduces gassing in the cell. Specifically 2 wt. % of an indium/bismuth metal alloy binder based on the dry zinc anode mixture weight was added to the zinc powder during preparation of the anode mixture 150. The indium/bismuth metal alloy additive had a weight ratio of indium to bismuth of about 66/34. The anode mixture was prepared by first dry blending the indium/bismuth alloy with the zinc powder. The zinc powder was in the form of particulate zinc alloyed with 150 ppm indium and 230 ppm bismuth.

The mixture was then continually heated to a temperature of 200° C. for a period of 60 minutes by heating the mixture in a rotating vat in an inert atmosphere of argon gas until a homogenous mixture was obtained. The mixture was then left to cool gradually to room temperature (20° C. to 27° C.) while still tumbling. As the mixture cooled, the metal binder solidified on portions of the individual zinc particles thereby "gluing" a percentage of the particles into agglomerates. The zinc particles within the agglomerates are held bound to each other by the metal binder which had become solidified and adhered to and between surfaces of the zinc particles. Dry gellant powder (Waterlock J-550) was then added to the cooled mixture of zinc agglomerates and the resulting mixture was stirred and inserted into the anode casing 160. An aqueous electrolyte solution (35 wt. % KOH and 2 wt. % ZnO) was then added to the mixture forming a gelled anode mixture 150 within anode casing 160. The gelled anode mixture 150 had the following composition: Zn (78.56 Wt. %); Gelling Agent Waterlock J-550 (0.26 Wt. %); Aqueous KOH electrolyte (19.61 Wt. %); Metal Indium/Bismuth Alloy Binder (1.57 wt. %). Except for Group A in Table 1, the anode mixture 150 contained zero added mercury (mercury content was less than 100 ppm of the zinc.).

Control cells were prepared identical to the above test cells except that the peripheral edge 168 and outside surface 162 of the anode casing were not plated with the protective metal of the invention, see Group B in Table 1. For comparative purposes, cells were also constructed from unplated/untreated anode cans containing Zn with 3% Hg, see Group A in Table 1. The test cells and control cells were stored together at ambient conditions for varying periods of time and examined for electrolyte leakage. The results of this ambient storage testing are described in Table 1. As shown, 4 microns of tin, silver, tin-lead, and copper significantly reduce crimp leakage at 12 and 18 months compared to unplated, As Received cans (Group B). In the case of plated copper, the advantage of the subsequent heat treating step is particularly striking where Group H, the heat treated group, achieves less than 1% leakage at 18 months.

TABLE 1

Crimp Leakage Summary for Triclad Anode Casing Entire Outside and Inside Surfaces and Peripheral Edge Plated with 4 Microns (nominal) of the Metals Listed.

| Group | Description | 1 Month Crimp Leakage (%) | 6 Months Crimp Leakage (%) | 12 Months Crimp Leakage (%) | 18 Months Crimp Leakage (%) |
|---|---|---|---|---|---|
| A | 3% Hg Control - Untreated Ni/SS/Cu Triclad Anode Casing with no additional plating. | 0.0 | 0.0 | 0.0 | 0.2 |
| B | Hg Free Cell (Untreated Ni/SS/Cu triclad anode casing with no additional plating. | 0.0 | 9.9 | 96.9 | 100.0 |
| E | Hg Free Cell (Plated Sn) All surfaces of Ni/SS/Cu triclad anode casing were plated with protective metal tin. | 0.0 | 0.3 | 0.3 | 1.0 |
| F | Hg Free Cell (Plated Cu) All surfaces of Ni/SS/Cu triclad anode casing were plated with protective metal copper. | 0.0 | 12.7 | 54.8 | 61.4 |
| H | Hg Free Cell (Plated Cu, then heat treat) All surfaces of Ni/SS/Cu triclad anode casing were plated with protective metal copper followed by heat treatment. | 0.0 | 0.0 | 0.2 | 0.7 |
| K | Hg Free Cell (Plated Sn on Zn) All surfaces of Ni/SS/Cu triclad anode casing were plated with protective metal zinc and then overplated with tin. | 0.0 | 0.0 | 0.0 | 0.0 |
| L | Hg Free Cell (Plated Sn/Pb alloy) All surfaces of Ni/SS/Cu triclad anode casing were plated with protective metal which was an alloy of tin and lead. | 0.0 | 0.0 | 0.5 | 57.1 |
| N | Hg Free Cell (Plated Sn on Ag) All surfaces of Ni/SS/Cu triclad anode casing were plated with protective metal silver and then overplated with tin. | 0.0 | 0.0 | 0.7 | 16.9 |
| O | Hg Free Cell (Plated Ag) All surfaces of Ni/SS/Cu triclad anode casing were plated with protective metal silver. | 0.0 | 1.4 | 4.6 | 7.5 |

The entire casing surfaces were plated. That is, the entire outside surface 162 (including also terminal surface 165)

and entire inside surface 166 and peripheral edge 168 were all plated with the metals shown in the separate group examples given in Table 2.

EXAMPLE 2

Selective Plating of the Anode Casing Surfaces
(Plating of Anode Casing Peripheral Edge and Portion of Outside Side-wall Surface Abutting Insulator)

Cells were prepared as described in Example 1 with the following exceptions. In group C and D the protective metal 161 was copper. In group C the protective metal copper was plated onto all surfaces of the anode casing, that is, the entire outside surface, entire inside surface including the peripheral edge 168 of the anode casing as in example 1. The copper protective metal was so plated onto an anode casing which itself was of a triclad Ni/SS/Cu material in all of the cells (Groups A–D). In group D the copper protective metal was plated onto the peripheral edge 168 and portion of outside surface sidewall abutting the insulator wall 172 (plating portion 161a) and also a small portion of the casing inside surface adjacent the peripheral edge. The copper protective metal was so plated onto an anode casing which was itself of a Ni/SS/Cu triclad material. Control groups of cells A and B had anode casing of the same Ni/SS/Cu triclad material but were not subsequently plated with the protective metal of the invention. All groups of cells had an anode mixture comprising particulate zinc which was an alloyed with 500 ppm Pb, 500 ppm In, and 80 ppm Al. An indium/bismuth (InBi) binder was added to the zinc anode. The InBi binder concentration in the anode mixture was 1.25wt % based on weight of the dry anode mixture (zinc plus binder). The Group C anode cans (see Table 2) were prepared by barrel plating (all surfaces) with the protective metal copper. For Group D, the anode casing peripheral edge 168 and portion of casing outside surface 162 abutting insulator wall 172 was selectively plated with a protective metal copper in accordance with the invention, see FIG. 3. The selective plating was achieved by holding the can to a cathodic bus bar with a rubber grommet and dipping the can in a copper plating bath in which an anode was submerged and then applying a DC current.

In the Group D cells the protective metal 161 of copper was plated onto the peripheral edge 168. A portion of the same protective metal 161 (portion 161a) was plated onto outside surface 162 abutting insulator wall 172 and also a portion of the same protective metal 161 (portion 161c) was plated onto a small portion 166a of the casing inside surface immediately adjacent peripheral edge 168 (FIG. 3). Thus, for the size 13 zinc air cell the protective metal copper was plated onto peripheral edge 168 and such copper plating also extended about 4 mm down the exterior sidewall 162 from the peripheral edge 168 and also approximately 1 mm below the peripheral edge 168 on the inside surface 166 of the can. By selective plating in this manner, the plated layer is concealed during final assembly. Thus the exterior negative anode contact is a nickel surface as in conventional cells. All of the cans from Groups C and D were heat treated at 500° C. for 20 minutes in a flowing 95% $N_2$/5% $H_2$ gas mixture.

Group A and B Control cells were prepared with mercury containing zinc and mercury free zinc identical to the above test cells except that the peripheral edge 168 and outside surface 162 of the anode casing were not plated with the protective metal of the invention. The test cells and control cells then underwent an accelerated leakage test. First the cells are washed to remove any residual KOH from the cell assembly process. After drying, the cells undergo a 2 week storage protocol in a high temperature and high humidity atmosphere. After storage, the quantity of electrolyte that leaked out of the cell through the crimp region between the anode and cathode casing is quantitatively measured and the results are presented in Table 2.

All cells in Table 2 had an anode casing of a triclad Ni/stainless steel/Cu material as a base material. As shown in Table 2, the cells constructed from such anode casings which were subsequently overplated entirely with the protective metal copper, Group C, or selectively copper plated, Group D, displayed essentially zero leakage of electrolyte similar to the cells containing 3% Hg. The Control cells (Group A) were made with mercury containing zinc and zero additional anode casing plating. Group B cells which were made with zero added mercury in the anode mixture and with no post plating of the anode casing suffered from high KOH leakage. Such values for this accelerated test correspond to visual crimp leakage in 6 months. Thus the use of plated anode cans as described here in Groups C and D enables mercury free cells to achieve parity leakage with cells that contain mercury.

TABLE 2

Average Electrolyte Leakage of Cells with Anode Casing Surfaces Selectively Plated with Protective Metal

| Group | ZINC/AIR CELL Description[3] | Average Electrolyte Leakage[1] (ug KOH/cell) |
|---|---|---|
| A | (Control Cell) 3% Hg added to Zinc anode mixture; Untreated Ni/SS/Cu triclad anode casing - No additional plating. | 0.0 |
| B | Hg Free Cells (Untreated Ni/SS/Cu triclad anode casing) No additional plating. | 26.9 |
| C | Hg Free Cells; Entire outside and inside surfaces and peripheral edge of anode casing of a Ni/SS/Cu triclad material were plated with protective metal copper. | 0.03 |
| D | Hg Free Cells; Selective plating of an anode casing. Ni/SS/Cu triclad material was plated with protective metal copper onto the peripheral edge and portion of outside surface abutting insulator of said casing[2]. | 0.0 |

Notes:
[1]Electrolyte leakage determined after cell storage (approximately equal to 6 months at ambient) with cell airholes coverd by tape.
[2]A small portion of the inside surface of the triclad anode casing immediately adjacent the peripheral edge was also plated with the protective metal copper.
[3]An indium/bismuth (InBi) binder was added to the zinc anode in group B, C, and D cells. The In/Bi binder concentration in the anode mixture was 1.25 wt % based on weight of the dry anode mixture (zinc plus binder). Size 13 zinc/air button cells were used.

Although the invention has been described with reference to specific embodiments, it should be appreciated that other embodiments are possible without departing from the concept of the invention. Therefore, the invention is not intended to be limited to the specific embodiments but rather, its scope is reflected by the claims and equivalents thereof.

What is claimed is:

1. A zinc/air depolarized cell comprising an anode casing and a cathode casing, an anode material comprising zinc particles and alkaline electrolyte within said anode casing, and a catalytic cathode within said cathode casing, wherein the cathode casing is in the form of a can having an open end and a closed end, and wherein said anode casing is in the form of a can comprising a body having an open end and a closed end and an inside surface and an outside surface, wherein the open end of the anode casing resides within the open end of the cathode casing with electrically insulating material between said anode and cathode casings and abutting at least a portion of said anode casing outside surface, wherein the anode casing has a circumventing peripheral edge surface at the open end thereof, wherein the anode casing comprises a triclad of three different metals comprising stainless steel having a layer of nickel on its outside surface and a layer of copper on the inside surface of said stainless steel, said copper layer in contact with said zinc, wherein at least a portion of each of said three different metals are exposed at the peripheral edge surface of said anode casing, wherein said anode casing peripheral edge surface is plated with at least one layer of a protective metal comprising tin, thereby covering and preventing exposure of said different metals at said peripheral edge surface.

2. The zinc/air cell of claim 1 wherein said cell has a disk-like cylindrical shape of diameter between about 4 and 20 mm and a height between about 2 and 10 mm.

3. The zinc/air cell of claim 1 wherein said cell has a disk-like cylindrical shape of diameter between about 4 and 12 mm and a height between about 2 and 6 mm.

4. The zinc/air cell of claim 1 wherein said protective metal is applied to cover said anode casing peripheral edge after said anode casing has been formed into said can shape.

5. The zinc air cell of claim 1 wherein at least a portion of the outside surface of said anode casing is also plated with said protective metal.

6. The zinc/air cell of claim 1 wherein at least a portion of the outside surface of said anode casing abutting said insulating material is plated with said protective metal and said insulating material is in contact with said protective metal providing a seal therebetween.

7. The zinc/air cell of claim 6 wherein the protective metal plated on said portion of the outside surface of said anode casing abutting said insulating material has the same composition as the protective metal plated on the anode casing peripheral edge.

8. The cell of claim 6 wherein at least a portion of said closed end of the anode casing is exposed to the external environment and said exposed portion is also plated with said protective material.

9. The zinc/air cell of claim 1 wherein said protective metal plated on said anode casing peripheral edge surface eliminates the electrochemical potential gradient at the surface of said peripheral edge thereby reducing the chance of electrolyte seepage from the cell.

10. The zinc/air cell of claim 1 wherein said protective metal plated over said anode casing peripheral edge has a thickness of between about 0.0001 and 0.015 mm.

11. The zinc/air cell of claim 1 wherein said protective metal plated onto said anode casing peripheral edge is of homogeneous composition.

12. The zinc/air cell of claim 11 wherein said protective metal plated onto said anode casing peripheral edge has a uniform thickness.

13. The zinc/air cell of claim 1 wherein said cathode casing has at least one hole in its surface to allow air to penetrate into the cell when the cell is in use.

14. The cell of claim 1 wherein the anode casing has a wall thickness between about 0.001 inches (0.0254 mm) and 0.015 inches (0.38 mm).

15. The cell of claim 1 wherein the nickel layer has a thickness of between about 0.0001 inches (0.00254 mm) and 0.001 inches (0.0254 mm).

16. The cell of claim 1 wherein said zinc particles comprises zinc alloyed with and alloy material comprising indium.

17. The cell of claim 16 wherein said alloy material comprises between about 100 and 1000 parts per million parts by weight based on pure zinc.

18. The cell of claim 1 wherein said zinc particles comprises zinc alloyed with an alloy material comprising indium, lead, and aluminum.

19. The cell of claim 18 wherein said alloy material comprises between about 100 and 2000 parts per million parts by weight based on pure zinc.

20. The cell of claim 1 wherein said cathode is a catalytic cathode comprising carbon and $MnO_2$.

21. The cell of claim 1 wherein the anode material comprises less than about 100 parts mercury per million parts of zinc by weight.

22. The cell of claim 1 wherein the inside surface of the anode casing is also plated with said same protective material.

23. A zinc/air depolarized cell comprising an anode casing and a cathode casing, an anode material comprising zinc and alkaline electrolyte within said anode casing, and a catalytic cathode within said cathode casing, wherein the cathode casing is in the form of a can having an open end and a closed end, and wherein said anode casing is in the form of a can comprising a body having an open end and a closed end and an inside surface and an outside surface, wherein the open end of the anode casing resides within the open end of the cathode casing with electrically insulating material between said anode and cathode casings and abutting at least a portion of said anode casing outside surface, wherein the anode casing has a circumventing peripheral edge surface at the open end thereof, wherein the anode casing comprises a triclad of three different metals comprising stainless steel having a layer of nickel on its outside surface and a layer of copper on the inside surface of said stainless steel, said copper layer in contact with said zinc, wherein at least a portion of each of said three different metals are exposed at the peripheral edge surface of said anode casing, wherein said anode casing peripheral edge surface is plated with at least one layer of a protective metal comprising thereby covering and preventing exposure of different metal at said peripheral edge surface.

* * * * *

UNITED STATES PATENT AND TRADEMARK OFFICE
CERTIFICATE OF CORRECTION

PATENT NO. : 6,830,847 B2
DATED : December 14, 2004
INVENTOR(S) : Karthik Ramaswami, Daniel Gibbons and Keith Buckle It is certified that error appears in the above-identified patent and that said Letters Patent is hereby corrected as shown below:

Column 22,
Line 54, after "comprising" add -- copper --.

Signed and Sealed this

Twenty-sixth Day of April, 2005

JON W. DUDAS
*Director of the United States Patent and Trademark Office*